United States Patent [19]

Nishimura

[11] Patent Number: 6,151,445

[45] Date of Patent: *Nov. 21, 2000

[54] FILM IMAGE INPUT METHOD AND APPARATUS WITH IMAGE INDEX DATA DETECTION

[75] Inventor: Toru Nishimura, Asaka, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/971,361

[22] Filed: Nov. 17, 1997

Related U.S. Application Data

[63] Continuation of application No. 08/467,022, Jun. 6, 1995, abandoned.

[30] Foreign Application Priority Data

Jun. 10, 1994 [JP] Japan .................................. 6-128897

[51] Int. Cl.[7] ............................. H04N 5/76; H04N 1/387
[52] U.S. Cl. ............................. 386/130; 348/96
[58] Field of Search .............................. 386/46, 121, 52, 386/129, 130, 128; 348/96, 97, 98; 358/906, 909.1; H04N 5/76

[56] References Cited

U.S. PATENT DOCUMENTS

| | | | |
|---|---|---|---|
| 4,728,978 | 3/1988 | Inoue et al. | 354/289.1 |
| 4,802,019 | 1/1989 | Harada et al. | 358/335 |
| 4,884,092 | 11/1989 | Inoue et al. | 354/289.1 |
| 4,887,115 | 12/1989 | Inoue et al. | 354/289.1 |
| 5,034,804 | 7/1991 | Sasaki et al. | 358/909.1 |
| 5,036,344 | 7/1991 | Inoue et al. | 354/106 |
| 5,134,434 | 7/1992 | Inoue et al. | 354/430 |
| 5,157,511 | 10/1992 | Kawai et al. | 358/335 |
| 5,258,859 | 11/1993 | Wada et al. | 358/909.1 |
| 5,382,973 | 1/1995 | Ikari et al. | 348/98 |
| 5,852,707 | 12/1998 | Inoue et al. | 386/128 |

FOREIGN PATENT DOCUMENTS

| | | |
|---|---|---|
| 62-208028 | 9/1987 | Japan . |
| 575922 | 3/1993 | Japan . |
| 9004301 | 4/1990 | WIPO . |

*Primary Examiner*—Huy Nguyen

[57] ABSTRACT

An index image data which shows all frames of a film within a film cartridge is stored in a memory card corresponding to a film cartridge or an IC memory integrated in a cartridge. Then, when an index image which shows plural frames is regenerated, the index image data stored in the memory card is read out, and the index image is displayed on a TV monitor in accordance with the readout index image data. As a result, when a person orders additional copies and views a film image on TV monitor, a desired film cartridge can easily be found without pulling the film from the film cartridge. Furthermore, at least the data which are used when one frame is regenerated are stored in the memory card, so that the pre-scanning can be omitted when one frame is regenerated and a desired film image can be displayed on the monitor.

11 Claims, 10 Drawing Sheets

FIG. 6(A)  A CASE THAT INDEX IS INPUT

ENLARGE TRANSFER

FIG. 6(B)

FIG. 6(C) MONITOR  DISPLAYED IMAGE

FIG. 6(D)  A CASE THAT ONE FRAME IS INPUT

FIG.7(A)

| 1 ⇑ ↕ | 2 | 3 | 4 | P S E T |
|---|---|---|---|---|
| 5 | 6 | 7 | 8 | R O T S |
| 9 | 10 | 11 | 12 | S K P S |
| 13 | 14 | 15 | 16 | V I E W |
| 17 | 18 | 19 | 20 | P L A Y |
| | | | | E N V |
| | | | | E N D |

FILM IMAGE INPUT METHOD AND APPARATUS WITH IMAGE INDEX DATA DETECTION

This application is a continuation, of application Ser. No. 08/467,022 filed on Jun. 6, 1995, now abandoned.

BACKGROUND OF THE INVENTION

1. Field of the Invention

The present invention relates to a film image input method and, more particularly to a film image input method including feeding a developed photographic film housed in a film cartridge to an image reading part so as to read out a film image and displaying the film image on a TV monitor.

2. Description of the Related Art

A conventional film image input method, which includes picking up an image on a developed still photographic film by an image sensor such as a CCD and the like, converting the image of the photographic film into an image signal, transmitting the image signal to a TV monitor, and displaying the film image on the TV monitor, is represented by WO90/04301 and Japanese Patent Application Laid-open No. 5-75922.

When the film is returned from the laboratory, a film cartridge which stores a roll of a developed film may be employed. Japanese Patent Application Laid-open No. 5-75922, for example, discloses a film image input apparatus in which the film cartridge is employed.

Moreover, a data record camera is proposed which stores the information relating to photographing and a print order in an IC card provided in a camera (Japanese Patent Application No. 62-208028). The IC card, in which predetermined information is recorded by the data record camera, is sent together with a corresponding film to the laboratory via a development agency, so that the necessary information for development can be delivered. The information relating to the processing in the laboratory, the number of prints, etc. is stored in the IC card so that the information can be returned to the user.

When returning the developed film which is stored in the film cartridge, it is necessary to pull out the film by a certain apparatus which looks at the film so as to determine what is photographed on the film stored in the cartridge. So, there is a problem in that it takes much time to find a desired film cartridge when ordering to take additional copies or enjoying the film image on the TV monitor.

On the other hand, the information which the laboratory exchanges with the customer by the conventional IC card is the one for the laboratory, and in this case, it takes much time to find the film cartridge, too.

SUMMARY OF THE INVENTION

The present invention has been developed in view of the above-described circumstances and has as its aim the provision of a film image input method wherein a requested film cartridge is easily understood and a desired film image can be displayed on a monitor in a short time.

To achieve the above-mentioned object, in a film image input method comprising the steps of feeding a developed photographic film stored in the film cartridge up to an image reading part so as to read a film image and displaying the film image on a TV monitor, a film image input method according to the present invention comprises the steps of storing index image data, which indicate all frames of the film stored in the film cartridge, in an outer storage medium which corresponds to the film cartridge, reading out the index image data stored in the outer storage medium when the index image which shows plural frames is regenerated, and displaying an index image on a TV monitor in accordance with the readout index image data.

The film image input method according to the present invention includes storing at least the data which are used when one frame is regenerated in the outer storage medium and image-processing in accordance with the data stored in the outer storage medium when one frame is regenerated.

According to the present invention, the index image data, which indicates all frames of the film in the film cartridge, are stored in the outer storage medium which corresponds to the film cartridge. In this case, the index image data can be stored with an apparatus in the laboratory or the user's film player. Then, when the index image which shows plural frames regenerated, the index image data stored in the outer storage medium are read out, and the index image is displayed on the TV monitor in accordance with the readout index image data.

As a result, when a person orders additional copies and enjoys the film image on the TV monitor, he can easily find a desired film cartridge without pulling the film out of the film cartridge.

Furthermore, at least the data which are used when one frame of the film is regenerated is stored in the outer storage medium, so that the pre-scanning can be omitted when one frame is regenerated and a desired film image can be displayed in a short time.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein.

DESCRIPTION OF THE PREFERRED EMBODIMENT

Detailed description will hereunder be given of the preferred embodiment of a film image input method according to the present invention with reference to the accompanying drawings.

Figure 1:
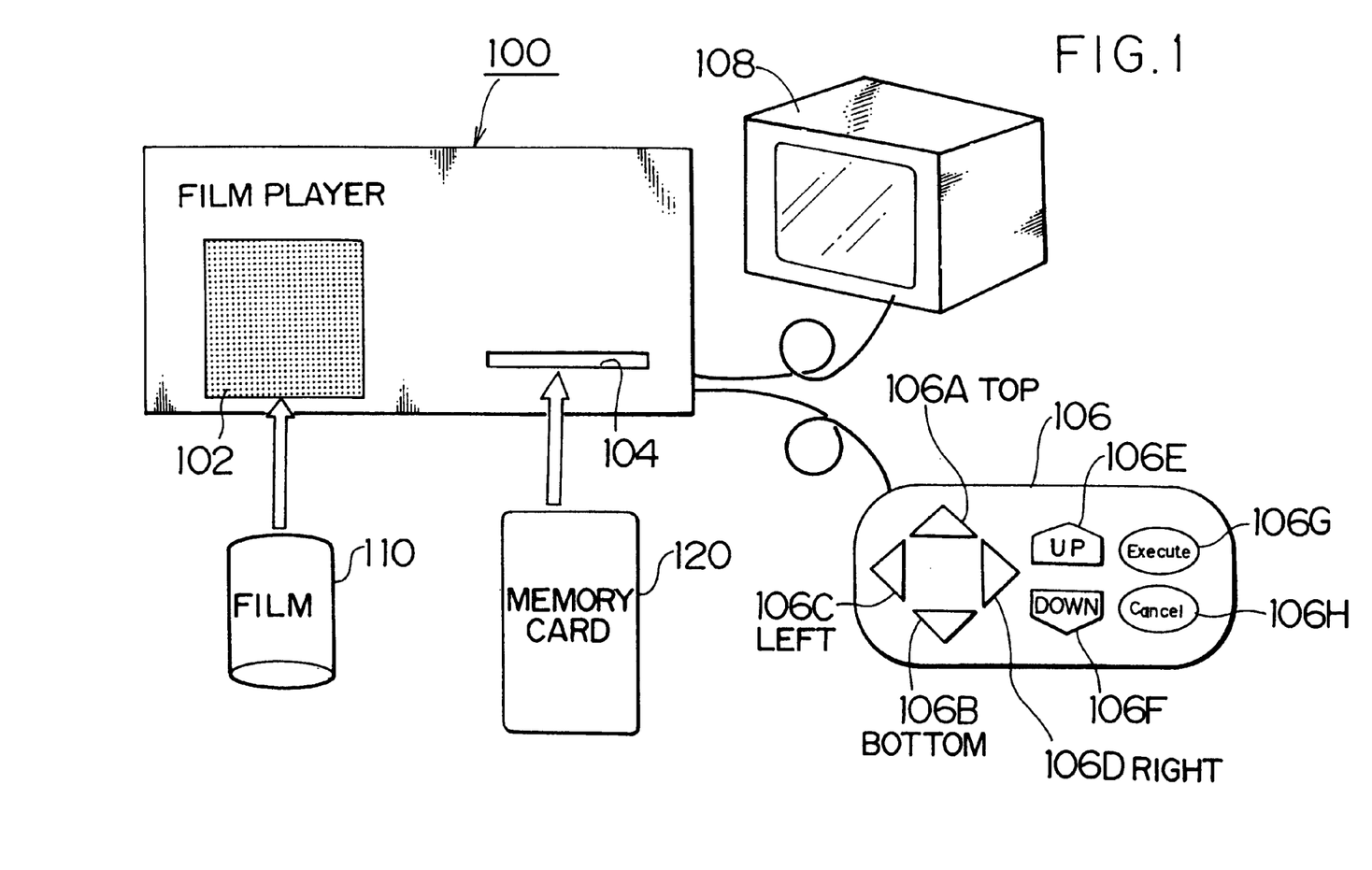
FIG. 1 is a view showing the entire structure of a system including a film player wherein the film image input method according to the present invention is used.

FIG. 1 is a view showing the entire structure of a system including a film player which uses a film image input method according to the present invention. As shown in FIG. 1, the film player 100 has a rectangular-parallelpiped shape, and a film cartridge housing part 102 and a memory card insertion part 104 are provided on the front surface of the film player 100. In the film cartridge housing part 102, the film cartridge 110 is stored or taken out when the film cartridge 110 is loaded/unloaded in the film cartridge 110. Similarly, in the memory card insertion part 104, a memory card 120 is pulled in and out at the same time as the film cartridge. Incidentally, in the case when an IC memory which is integrated in the film cartridge is used instead of the memory card 120, the film cartridge including the IC memory is only housed.

A key pad 106 and a TV monitor 108 are connected to the film player 100, and different kinds of operation signals are transmitted from the key pad 106 to the film player 100 so as to control the film player 100. A video signal is sent from the film player 100 to the TV monitor 108. A detailed explanation will be given of the key pad 106 which controls the film player 100. The key pad 106 sends the operation signal, but the present invention is not limited to this. Infrared remote control transmitter and receiver can be provided in the key pad 106 and the film player 100 respectively, and the key pad 106 can transmit the operation signal as the infrared remote control signal to the film player 100.

Figure 2:
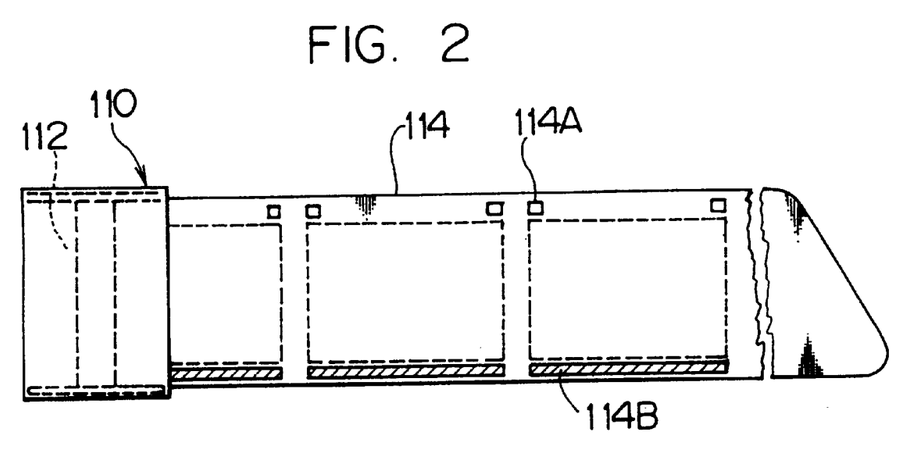
FIG. 2 is a view showing one example of the film cartridge which is used in the film player of FIG. 1.

The film cartridge 110 has a single spool 112 as shown in FIG. 2, and a photographic film 114 is wound around the spool 112. In the photographic film 114, a perforation 114A is provided, which indicates a position of each frame, and a magnetic record layer 114B is formed on the entire surface or the edge of the film. The magnetic data, which indicates the photographing data of each frame, etc., can be recorded in the magnetic record layer 114B by a camera with a magnetic head. And, the developed photographic film 114 is wound into and housed in the film cartridge 110.

The camera which was used with the film cartridge 110 can record different kinds of the magnetic data of each frame in the magnetic record layer 114B of the film 114 by the magnetic head housed in the camera. The magnetic data to be stored is, for example, frame numbers, a print format indicating one type of a high-definition image, a panoramic image or an ordinary image, the date/time of photographing and the like. Many kinds of other data can be stored in accordance with the camera. Not only a frame area exposed by an object light, but a film type, a bar code indicating frame numbers, the data which indicates the print format, etc. with a light source housed in the camera at the time of photographing can be optically stored in the area except for a frame area exposed to light on the photographic film 114.

Figure 3:
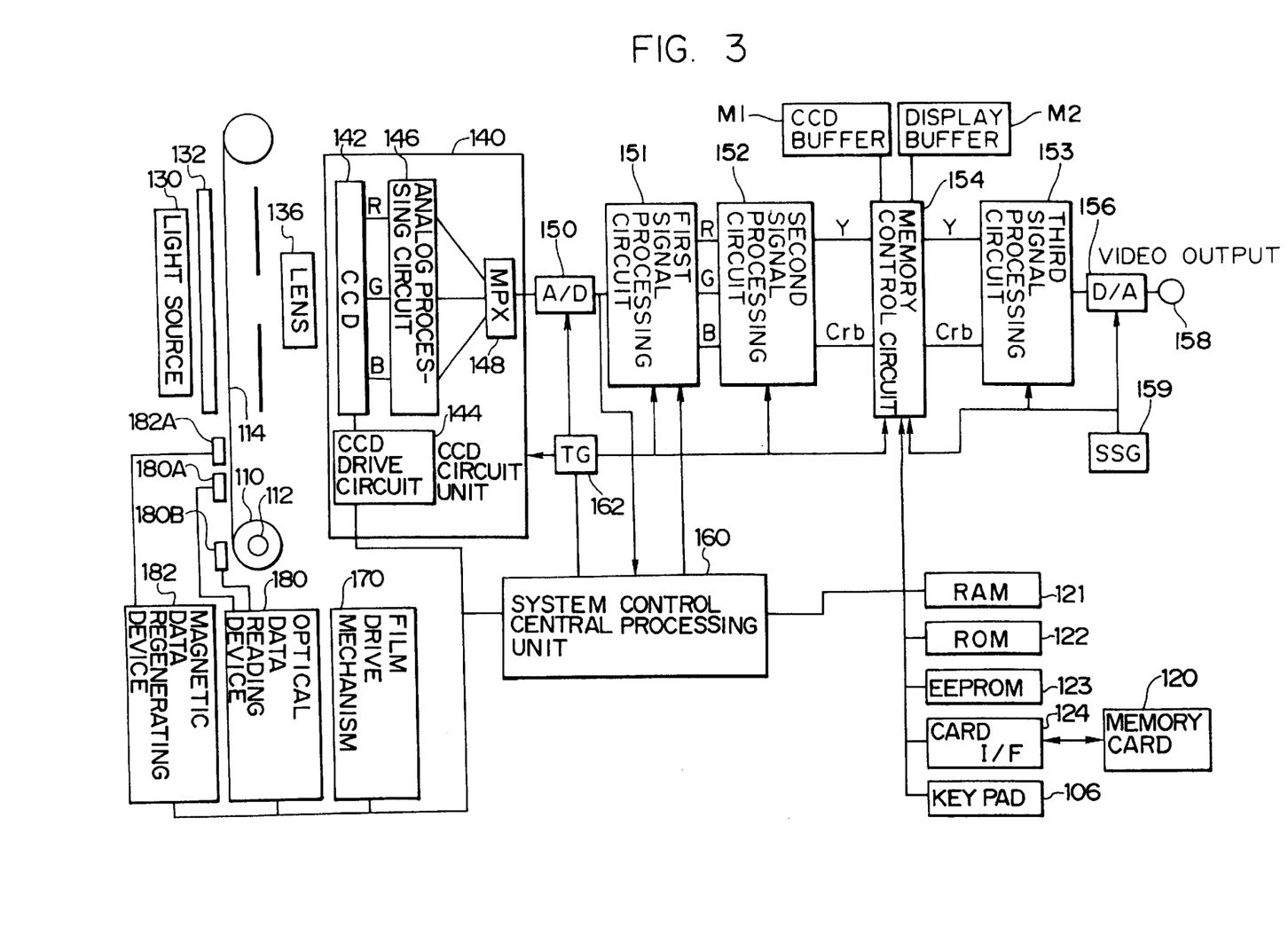
FIG. 3 is a block diagram showing one embodiment of the inner structure of the film player of FIG. 1.

FIG. 3 is a block diagram showing one embodiment of the inner structure of the film player 100. The film player 100 mainly comprises a light source 130 for illumination, a taking lens 136, a CCD circuit unit 140 which includes a CCD line censor 142, a first signal processing circuit 151, a second signal processing circuit 152, a third signal processing circuit 153, a memory control circuit 154, a CCD buffer M1, a display buffer M2, a central processing unit (CPU) 160, a film drive mechanism 170, an optical reading device 180, a magnetic data regenerating device 182, and so forth.

The light source 130 is a fluorescent light which stretches in the direction perpendicular to the feed direction of the film 114, for example, and illuminates the film 114 through an infrared cutting filter 132. An image light, which has been transmitted through the film 114, is formed on a light-accepting surface of the CCD line sensor 142 through the taking lens 136. Incidentally, while the CCD line sensor 142 is picking up the film image, the film 114 is conveyed at a fixed speed by the film drive mechanism 170 in the direction of an arrow A (the forward direction) or the direction of an arrow B (the backward direction). A detailed explanation of the film drive will be given later.

The CCD line sensor 142 is provided in the direction perpendicular to the film feed direction. The image light formed on the light-accepting surface of the CCD line sensor 142 is charged for a predetermined period of time in each sensor, which has R, G and B filters, and is converted into R, G and B signal charge which corresponds to the light strength. The signal charge is sent to a shift register by a lead gate pulse of a predetermined cycle, which is added by the CCD drive circuit 144, and sequentially read out from the CCD line sensor 142 by a register transfer pulse.

Incidentally, the CCD line sensor 142 has a sensor of 1024 picture elements, for example, in the direction perpendicular to the film feed direction. And, in the case that the cycle of the lead gate pulse, etc. of the CCD drive circuit 144 does not change, the number of picture elements in the same direction as the film feed direction of one frame changes according to the film feed speed, for example when the film feed speed is ½, 1, 8, 16 times as fast as that in the case when the standard film image is picked up, the number of picture elements is 1792, 896, 112, and 56 respectively. The signal charge, which has been read out from the CCD line sensor 142 in the above-mentioned way, is cramped by a CDS cramp and sent to an analog processing circuit 146 as R, G and B signals, and a gain, etc. of the R, G and B signals are controlled in the analog processing circuit 146. The multiplexer 148 dot-sequentially transmits R, G and B signals which are sent from the analog processing circuit 146, and the R, G and B signals are converted into digital signals by the A/D converter 150, and then added to the first signal processing circuit 151 and the CPU 160.

The first signal processing circuit 151 includes a white-balance adjustment circuit, a negative-positive inversion circuit, an γ-correction circuit, a RGB circuit which transmits R, G and B signals simultaneously, and so forth, and sends R, G and B signals to the second signal processing circuit 152 after signal-processing the dot-sequential R, G and B signals, which are sequentially added, in each circuit. Incidentally, the white-balance adjustment circuit in the first signal processing circuit 151 carries out the white-balance in accordance with control signal which is transmitted from the CPU 160, and an detailed explanation on it will be given later.

The second signal processing circuit 152 includes a matrix circuit, produces a luminance signal Y and a chroma signal $C_{r/b}$ from the entered R, G and B signals, and sends them to the memory control circuit 154.

The memory control circuit 154 controls the transmission of the luminance signal Y and the chroma signal $C_{r/b}$ from the memory control circuit to the CCD buffer M1, and also controls the transmission of the luminance signal Y and the chroma signal $C_{r/b}$ from the CCD buffer M1 to the display buffer M2. Incidentally, the detailed explanation will be given later of the CCD buffer M1 and the control of the writing/reading in the display buffer M2.

The luminance signal Y and the chroma signal $C_{r/b}$ which are read out from the display buffer M2 by the memory control circuit 154 are sent to the third signal processing circuit 153. The third signal processing circuit 153 produces a color composite video signal of NTSC system, for example, and transmits it to a video output terminal 158 via the D/A convertor. Incidentally, the synchronizing signal which has a predetermined cycle are transmitted to the memory control circuit 154, the third signal processing circuit 156 and the D/A converter 153 by a sync-generator 159. As a result, a timing signal which is controlled by the CPU 160 is added to the CCD circuit unit 140, the A/D converter, the first signal processing circuit 151, the second signal processing circuit 152 and the memory control circuit 154 by a timing signal generator 162 which is controlled by the CPU 160, so that each circuit can be synchronized.

The film drive mechanism 170 is connected to the spool 112 of the film cartridge 110, and comprises a film supplying part which rotates the spool 112 forward/backward, a film winding part which winds the film 114 sent from the film supplying part, and a mechanism which is provided in a film conveying path and which feeds the film 114 through and between a capstan and a pinch roller at a fixed speed. Incidentally, the film supplying part drives the spool 112 of the film cartridge 110 clockwise in FIG. 3, and feeds the film 114 from the film cartridge 110 until the forward end of the film is wound by the film winding part.

An optical data reading device 180 includes a first optical sensor 180A, which optically detects a perforation 114A of the film 114, and a second optical sensor 180B, which optically detects the optical data such as a bar code, etc. written in the edge of the film, and processes the optical data which is detected by these optical sensors 180A and 180B and transmits them to the CPU 160.

The magnetic data regenerating device 182 has a magnetic head 182A, reads out magnetic data, which are recorded in the magnetic record layer 114B of the film 114, with the magnetic head 182A. The device 182 processes the magnetic data to send them to the CPU 160 and stores them in a RAM 160A. Then, it reads out the data stored in the RAM 160A of the CPU 160, converts them into appropriate signals for a magnetic recording to transmit them to the magnetic head 182A so as to record them in the magnetic record layer 114B of the film 114.

In addition to the key pad 106 a random access memory (RAM) 121, a reading only memory (ROM) 122, an electrically erasable programmable reading only memory (EEPROM) 123, and a card interface 124 are connected to the CPU 160.

A film player control program and a load program for loading the stored contents of the memory card 120 are previously stored in the ROM 122. The CPU 160 carries out the processing by operating the key pad 106 as well as the control of the film player 100 with the program stored in the ROM 122. The CPU 160 loads the contents stored in the memory card 120 in the EEPROM 123 via the interface 124, and writes the information, which is stored in the RAM 121 or the EEPROM 123, in the memory card 120 via the interface 124.

Next, an explanation will be given of the operation of the film player 100 structured as mentioned above with reference to a flow chart of FIG. 4.

Figure 4:
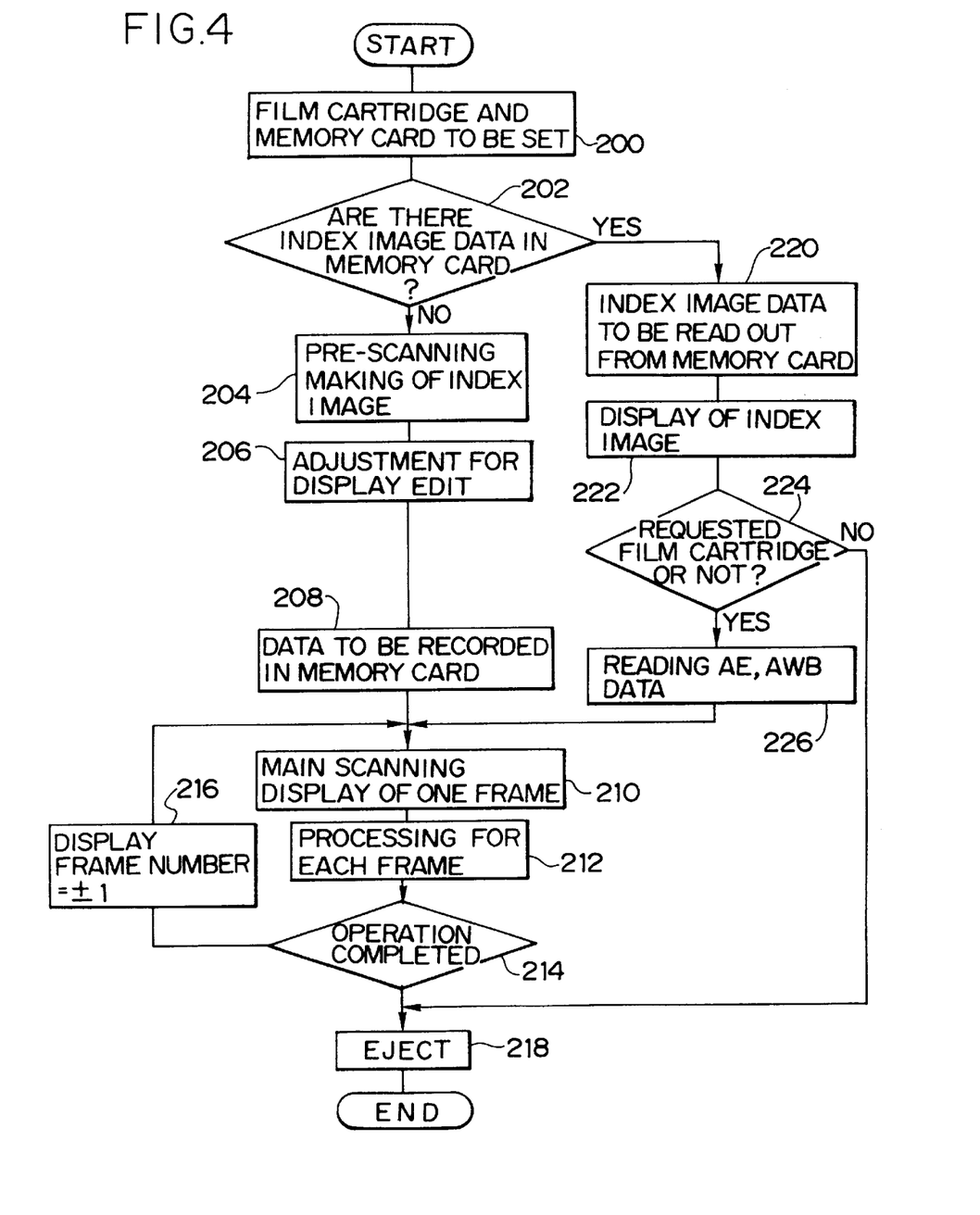
FIG. 4 is a flow chart explaining the operation of the film player of FIG. 1.

First, the film cartridge 110 is housed in the film cartridge housing part 102, and the memory card 120 which corresponds to the film cartridge 110 is set in the memory card insertion part 104 (step 200). Next, it is judged whether or not the index image data which will be described later, the AE data and the AWB data, etc. are stored in the memory card 120 (step 202).

In the case that the index image data, etc. are not stored, the CPU 160 loads the film by controlling the film drive mechanism 170. That is, the film 114 is supplied from the film cartridge, and its forward end is wound around an axis of the film winding part. After that, the first pre-scanning of the film 114 is carried out. That is, the film 114 is fed at a high speed of 148.0 mm/s in the forward direction. At the time of the first pre-scanning in the forward direction, the image data are picked up by the CCD line sensor 142, and the optical data and the magnetic data are read out by the optical reading device 180 and the magnetic data regenerating device 182.

Next, an explanation will be given of the processing in accordance with the image data, which are picked up at the time of the first pre-scanning.

The CPU 160 receives the dot-sequential R, G and B signals from the A/D converter 150 of FIG. 3. The CPU 160 picks up the respective R, G and B signals from all frames, calculates the offset amount for respective color signals and the gain adjustment amount for respective color signals so as to adjust the white-balance, and stores the offset data, which indicates the offset amount and the AWB data, which indicates the gain adjustment amount, in the RAM 121. The CPU 160 stores the AE data, which indicate the brightness of each frame, in the RAM 121 from the R, G and B signals of each frame. Incidentally, the CPU 160 can detect each frame of the film 114 in accordance with the optical data and/or the magnetic data added by the optical data reading device 180 and the magnetic data regenerating device 182, and it can also detect the frame numbers by counting each frame.

Figure 5:
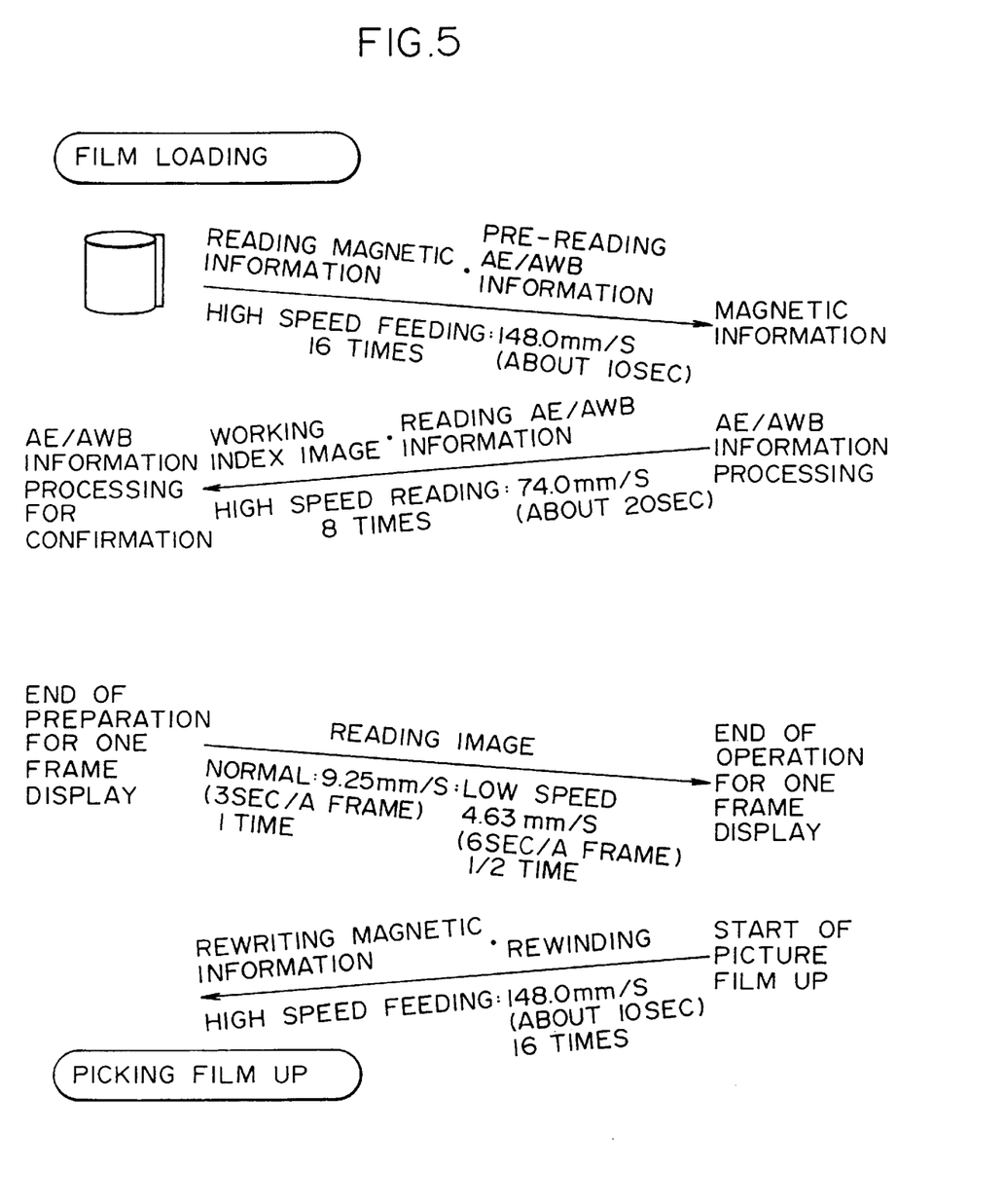
FIG. 5 is a view showing one example of a sequence of the film conveyance.

Next, the CPU 160 carries out the second pre-scanning of the film 114. That is, it feeds again the film 114 at a high speed 74.0 mm/s in the backward direction as shown in FIG. 5. At the time of feeding the film in the backward direction in the second pre-scanning, the image data is picked up by the CCD line sensor 142 again. At this time, the CPU 160 adjusts the exposure for each frame by controlling the charging time in the CCD line sensor 142 in accordance with the AE data stored in the RAM 121.

The CPU 160 adjusts the offset amount and the white balance of the R, G and B signals for each frame in the first signal processing circuit 151. That is, the CPU 160 outputs the offset data for each color signal in each frame, which is stored in the RAM 121, to the first signal processing circuit 151, and the first signal processing circuit 151 adjusts the offset amount of the dot-sequential R, G and B signals in accordance with the offset data. Similarly, the CPU 160 sends the AWB data for each color signal in each frame, which is stored in the RAM 121, to the first signal processing circuit 151, and the circuit 151 adjusts the gain of the dot-sequential R, G and B signals in accordance with the AWB data.

Because the image data in each frame is adjusted in accordance with the AE data, the AWB data, etc., the high-quality image data can be picked up regardless of the photographing condition of each frame.

Figure 6A:
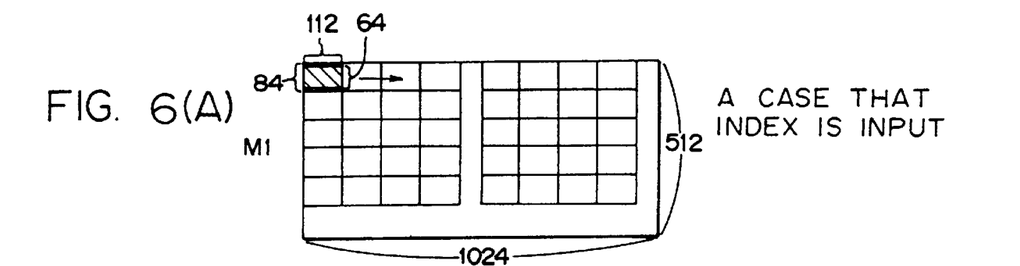
FIGS. 6(A), 6(B), 6(C) and 6(D) are views showing storage regions of CCD buffer and a display buffer in the film player shown in FIG. 1 and a display screen of the TV monitor.

The adjusted image data in each frame, that is, the luminance signal Y and the chroma signal $C_{r/b}$ which are transmitted from the second signal processing circuit 152 are sequentially stored in the CCD buffer M1 via the memory control circuit 154. Incidentally, because the film 114 is fed at a speed which is eight times as fast as the feeding speed in the case when the normal film image is picked up, the number of picture elements in the same direction as the film feed direction of one frame is 112 as shown in FIG. 6(A). The CCD line sensor 142 has a sensor of 1024 picture elements in the direction perpendicular to the film feed direction as mentioned above. In this case, the picture elements are thinned out to be 1/16 of 1024 picture elements, therefore, the number of picture elements in the direction perpendicular to the film feed direction of one frame is 64. The CCD buffer M1 has a capacity for storing the data of 512×1024 picture elements as shown in FIG. 6(A), so it can store the image data of 5×4×2(=40) frames. That is, the image data (the index image data) showing the index image of 40 frames are stored in the CCD buffer memory.

Figure 6B:
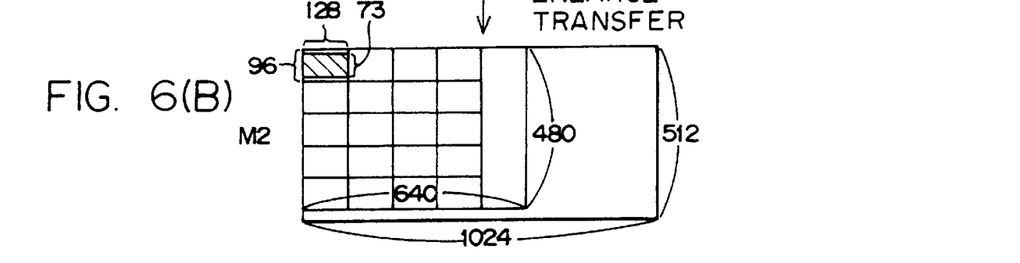
Figure 6C:
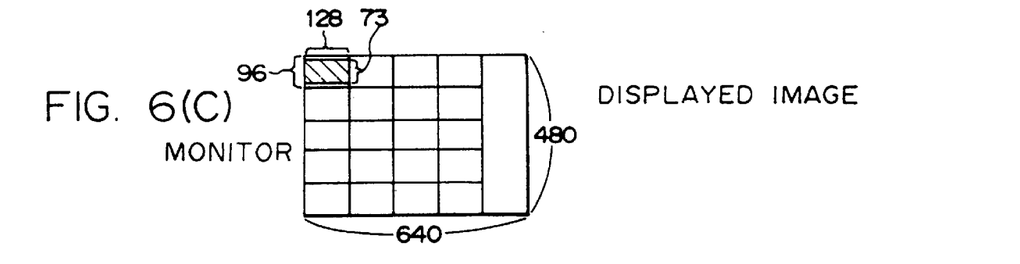

The display buffer M2 also has a capacity for storing the data of 512×1024 picture elements as shown in FIG. 6(B), when storing the index image data, it stores the image data of 5×4(=20) frames in a state that the picture elements of each frame are thinned out to be 73×128. And, when the index image is displayed on the TV monitor 108, the region of 480×640 picture elements at the upper left of the display buffer M2 is read out (refer to FIGS. 6(B) and (C)).

In the CCD buffer M1, the image data of each frame is sequentially stored from the upper left toward the right side in the storage region according to the order that the image data of each frame are read at the time of scanning, and when the image data of four frames are stored, the image data are sequentially stored from the left to the right in the storage region one line below. Then, when the image data of five lines (4×5=20 frames) are stored, the image data are also stored in the next storage region of twenty frames.

While the image data are stored in the CCD buffer M1, the stored data in the CCD buffer M1 are transmitted to the display buffer M2. As a result, the image data are sequentially displayed from the upper left toward the right side.

Because the display buffer M2 can store the image data for only twenty frames at a time, when the CCD buffer M1 receives the image data of twenty-first frame are transmitted into the CCD buffer M1, the image data in the display buffer M2 are rewritten and read in such a manner that the index image can scroll in the upward direction. For example, when the image data of the twenty-first frame is sent to the CCD buffer M1, the image data in the storage region in one line from frame No. 1 to No. 4 of the display buffer M2 is cleared, and the image data in the twenty-first frame is written, and the address of the scanning starts when the video signal are transmitted, is changed to the second line. As a result, the index image, which has been scrolled in the upward direction by one line, is displayed on the TV monitor 108. In this way, the image data of al the frames are stored in the CCD buffer M1. And, on the TV monitor 108, the screen is scrolled in the downward direction or changed over so that the image of frames No. 1–No. 20 can be displayed again.

The CPU 160 displays the index image, in which frame numbers are superimposed, by designating each frame to be No. 1, No. 2 . . . according to the order that the image data of each frame are read out at the time of the scanning and sending a character signal which indicates a frame number of each frame (step 204).

When the index image is made as described above and the index image is displayed on the TV monitor 108, the user interactively carries out the editing and other designations, which are necessary for one frame to be displayed on the TV monitor 108, by using the key pad 106 while watching the index image (206).

That is, the key pad 106 is composed of the top, bottom, right and left keys 106A, 106B, 106C and 106D, an "UP" key 106E, a "DOWN" key 106F, an "Execute" key 106G and a "Cancel" key 106H as shown in FIG. 1.

Figure 7A:
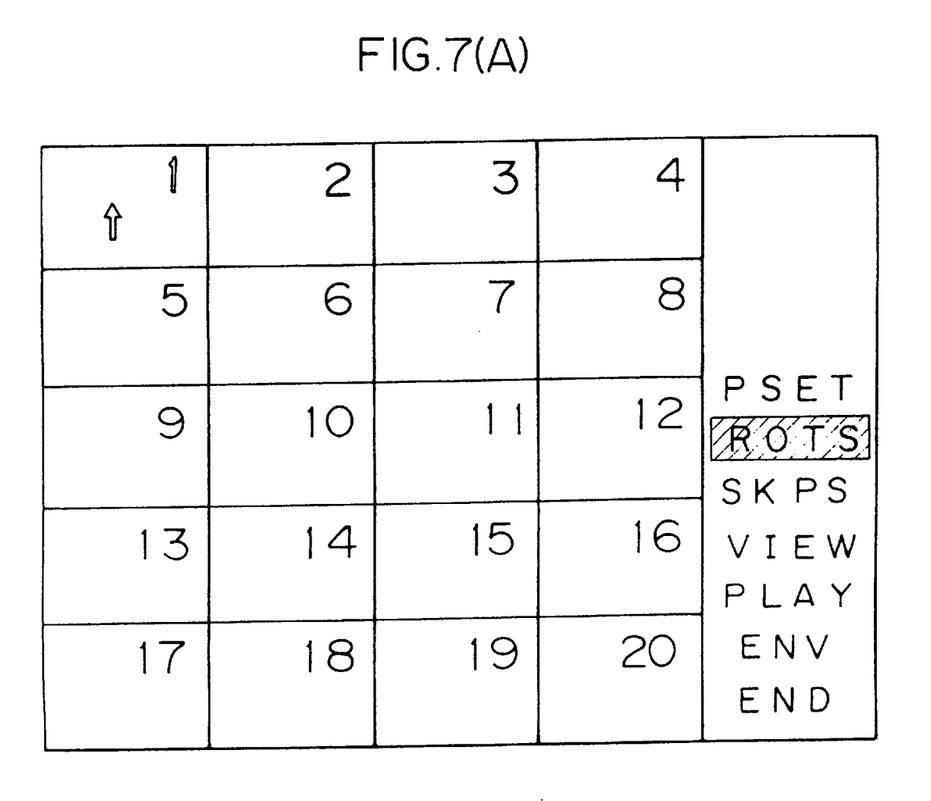
FIGS. 7(A) and 7(B) are views explaining how to determine the crosswise and lengthwise of a frame by using the index image.
Figure 7B:
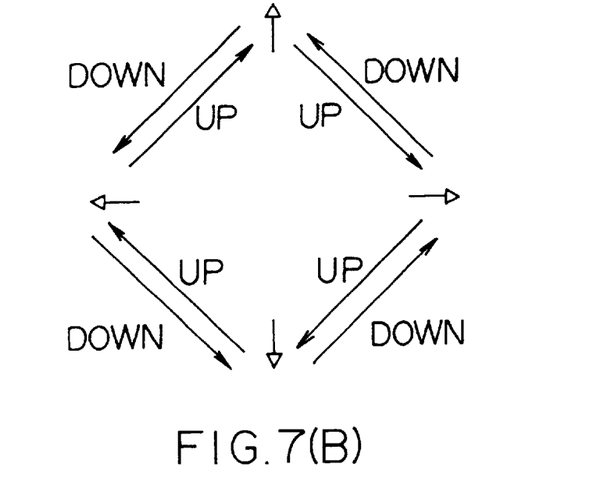

The CPU 160 displays the index image for twenty frames and control menu on the TV monitor 108 as shown in FIG. 7. For example, the menu comprises "PSET" meaning to designate the number of prints, "ROTS" meaning to designate the length and breadth of a frame, "SKPS" meaning to designate the frames which are not displayed at the time of the regeneration, "VIEW" meaning to regenerate frames one by one, "PLAY" meaning to regenerate each frame sequentially at the fixed intervals, "ENV" meaning to designate the environment such as the interval time and the background color, and "END" means that the editing by using the index image is over.

A user moves a cursor to a position of the desired command with the "UP" and "DOWN" keys 106E and 106F of the key pad 106 and pushes the "Execute" key. Incidentally, the selected command is distinguished from others with a color and the like. When the command is selected, the first frame is a frame to be edited, and a frame number of the first frame is displayed (the frame number is blinked). A frame to be edited can be selected by operating the top, bottom, right and left keys 106A–106D of the key pad 106.

For example, when the cursor is moved to "ROTS" and the "Execute" key 106G is pushed, the command to designate the lengthwise and crosswise is selected.

When the command to designate the lengthwise and crosswise is selected, a frame number of the desired frame which is to be edited blinks, and an arrow ↑ is displayed on the image of the frame. In this state, when the "UP" key 106E is pushed, the arrow rotates clockwise by 90° every time the key is pushed. When the "DOWN" key 106F is pushed, the arrow rotates counterclockwise by 90° every time the key is pushed. When the arrow is set in the same direction as a correct image and the "Execute" key 106G is pushed, the image data in the storage region of the desired frame in the display buffer M2 are rotated in accordance with the set direction. Incidentally, the number of picture elements in the length and breadth of one frame is different as shown in FIG. 6, so the image is contracted when the image data are rotated from the length to the breadth, and the image is magnified when the image data is rotated from the breadth to the length. Incidentally, the designated contents can be cancelled by the Cancel key 106H.

After carrying out the editing while looking at the index image in the above-mentioned way, when the user moves the cursor to "END" and pushes the Execute key 106G, the editing by using the index image is completed.

When the editing by using the index image is over, the index image data, the AE data, the AWB data, the editing data, and so forth are stored in the memory card 120.

Next, an explanation will be given of the case when each frame is displayed, edited, and so forth.

First, the display frame number is set at 1, and then the film 114 is fed for one frame in the forward direction at a speed of 9.25 mm/s, so that the frame of which number is 1 is scanned (main scanning). During the main scanning, the CCD buffer M1 picks up the image data via the CCD line sensor 142.

Figure 6D:
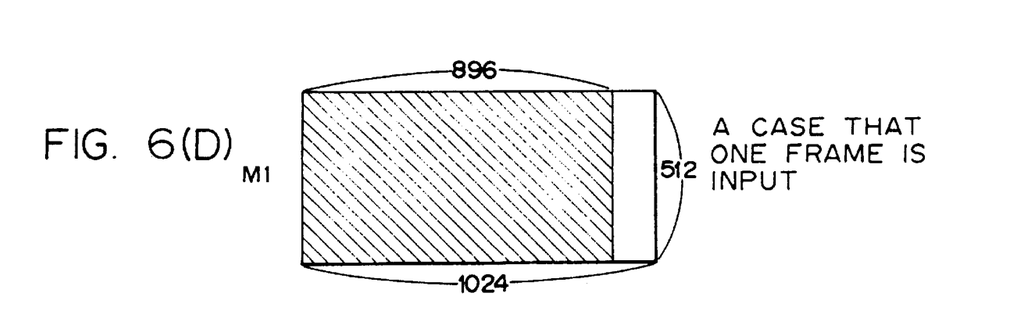

When the image data are picked up, the CPU 160 adjusts the image data of each frame in accordance with the AE data, the AWB data, etc. which are stored in the RAM 121, so the high-quality image data can be picked up regardless of the photographing conditions of each frame. The number of picture elements in one frame which is picked up by the CCD buffer M1 is 512×896 as shown in FIG. 6(D). That is, half of the CCD output from the CCD line sensor 142 which has a sensor of 1024 picture elements is thinned out at the time of the main scanning, so that the number of picture elements in the direction perpendicular to the film feed direction of one frame is 512. The film feed speed is set to be ⅛ compared to that in the case when the image data of the index image are picked up, so that the number, so that the number of picture elements in the direction perpendicular to the film feed direction of one frame is 896, which is eight times as large as that of picture elements (112) in the same direction as the film fed direction of one frame of the index image.

The image data of one frame, which are picked up by the CCD buffer M1 as described above, are transferred to the display buffer M2, and the contents which are stored in the display buffer M2 are repeatedly read out, so that the image of one frame can be displayed on the TV monitor 108 (step 10).

Figure 8:
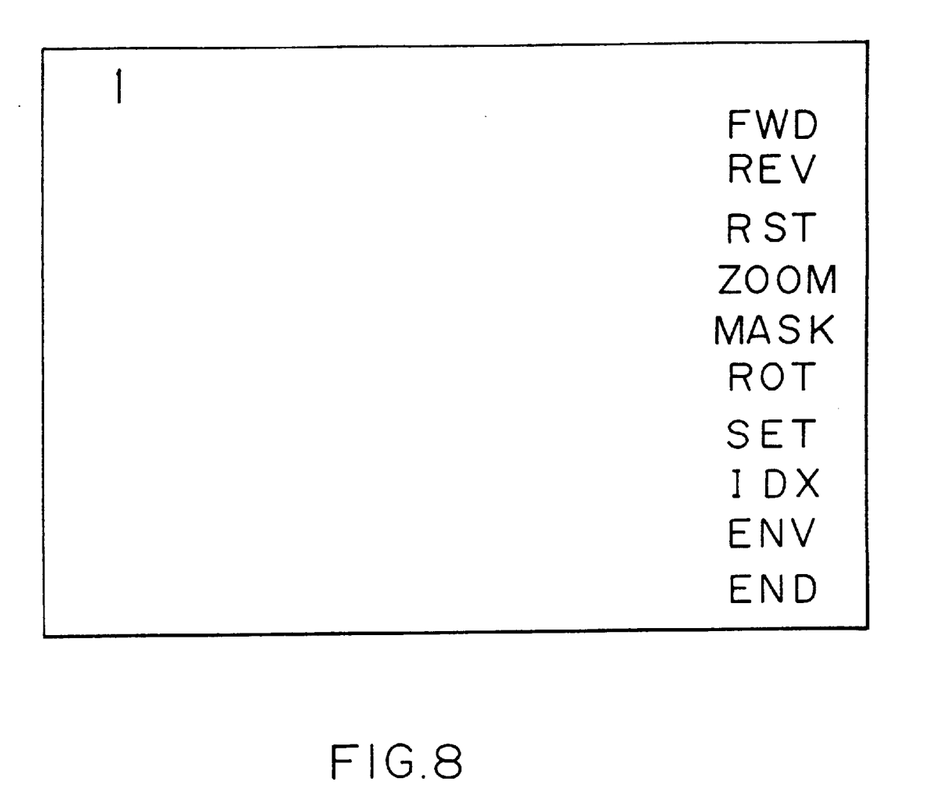
FIG. 8 is a view showing one example of a monitor screen when the mode is to designate the regeneration of one frame.

Incidentally, when the mode is set to designate the regeneration of one frame, as shown in FIG. 8, the frame numbers are displayed at the upper left on the screen of the TV monitor, and the letters, which indicate the designation menu necessary for the editing of one frame, are displayed at the right side on the screen of the TV monitor 108. Incidentally, "FWD" means to designate the next frame, "REV" means to regenerate the previous frame, "RST" means to reset each designation and carry out the re-scanning, "ZOOM" means to designate a zoom, "MASK" means to designate a mask, "ROT" means to designate the crosswise and lengthwise of a frame, "SET" means to designate the number of prints, etc., "IDX" means to display the index image, "ENV" means to designate an environment such as interval time, a background color, etc., and "END" means to complete the editing wherein the image of one frame is used.

As described above, the command is selected by moving the cursor with the "UP" and "DOWN" keys 106E and 106F and pushing "the Execute" key 106G.

For example, when the cursor is moved to "ZOOM" and the "Execute" key 127 is pushed, the command is to designate the zoom. In this command, a pointer is moved to designate the center of the zoom by operating the top, bottom, right and left keys 106A–106D of the key pad 106. Then, the zooming-up or the zooming-out by means of electric zooming is carried out by pushing the "UP" key 106E or the "DOWN" key 106F. When the desired zooming is completed in this way and the "Execute" key 106G is pushed, the zoom is designated and the designation is stored in the RAM 121 of the CPU 160.

Supposing that the zooming in the range from 0.5 to 1.5 can be carried out in the above-mentioned electric zooming. When the magnification of the electric zooming is 1.5, and the zooming-up is designated by the "UP" key, the main scanning is carried out at a low speed. In this case, the film 114 is fed in the forward direction at a speed of 4.63 mm/s (½ of the normal main scanning), and the CCD output of the CCD line sensor 142 around the center of the zoom is picked up without being thinned out. As a result, the image data, which are double-zoomed compared to the data at the time of the normal main scanning, are picked up. The image data can be triple-zoomed at the maximum by being electrically zoomed.

When the cursor is moved to "END" and the "Execute" key 106G is pushed after the display frames are edited, the editing of the display frames is completed (step 212). On the other hand, when the cursor is moved to "FWD" or "REV" and the "Execute" key 106G is pushed, the frame number is increased or decreased by one (step 216), and the operation returns to the step 210. As a result, the editing of the other frames can be carried out in the same way as above mentioned.

When the editing of the display frames is completed (step 214), the film 114 is fed in the backward direction at a high speed of 148.0 mm/s as shown in FIG. 5, and the data, which was read out from the magnetic record layer 114B of the film 114 and stored in the RAM 121 of the CPU 160, are stored again in the memory card 120 and the magnetic record layer 114B of the film 114, and, after the feeding is completed, the film cartridge 110 and the memory card 120 are taken out (step 218).

On the other hand, in the step 202, in the case that the index image data, AE data, AWB data, etc. are stored in the memory card 120, the index image data is read out from the memory card 120 and loaded in the display buffer M2, so that the index image is displayed on the TV monitor 108 (step 220 and step 222).

A user can determine whether the film cartridge set together with the memory card is a film cartridge in which a desired film image is photographed (step 224). When the film cartridge is not a desired one, the operation proceeds to the step 218, and the film cartridge and the memory card are ejected.

On the other hand, when the film cartridge is a desired one, the AE data, the AWB data, etc. are read out from the memory card 120, and they are stored in the RAM 121 (step 226). Then, the operation proceeds to the step 210, and one frame is displayed by carrying out the main scanning as mentioned previously, and the editing, the input of the order are performed for each frame.

As explained above, by using the memory card 120 in which the index image data and the like are stored, the user can find a desired film cartridge without carrying out the pre-scanning and regenerate one frame in a short time.

Incidentally, when an identification information relating to the film cartridge 110 (for example, an ID number put on a film cartridge) is stored in the memory card 120, and it is determined whether the identification information relating to both of the film cartridges are the same before regeneration, and the regeneration processing is carried out only when the identification information relating to two film cartridges. As a result, the incorrect combination can be prevented. The memory card and the film cartridge do not necessarily correspond to each other, and the index image data, etc. of plural film cartridges can be stored in one memory card. In this case, however, there is a need to display not only the index image but the identification information relating to the film cartridge which corresponds to the index image.

The information to be stored in the memory card 120 are the index data, the AE data, the AWB data, the photographing date, the film format, the information relating to the zoom trimming information, the information relating to the proofreading and the scattering of a sensitivity in a CCD pick-up optical system, and so forth.

Figure 9:
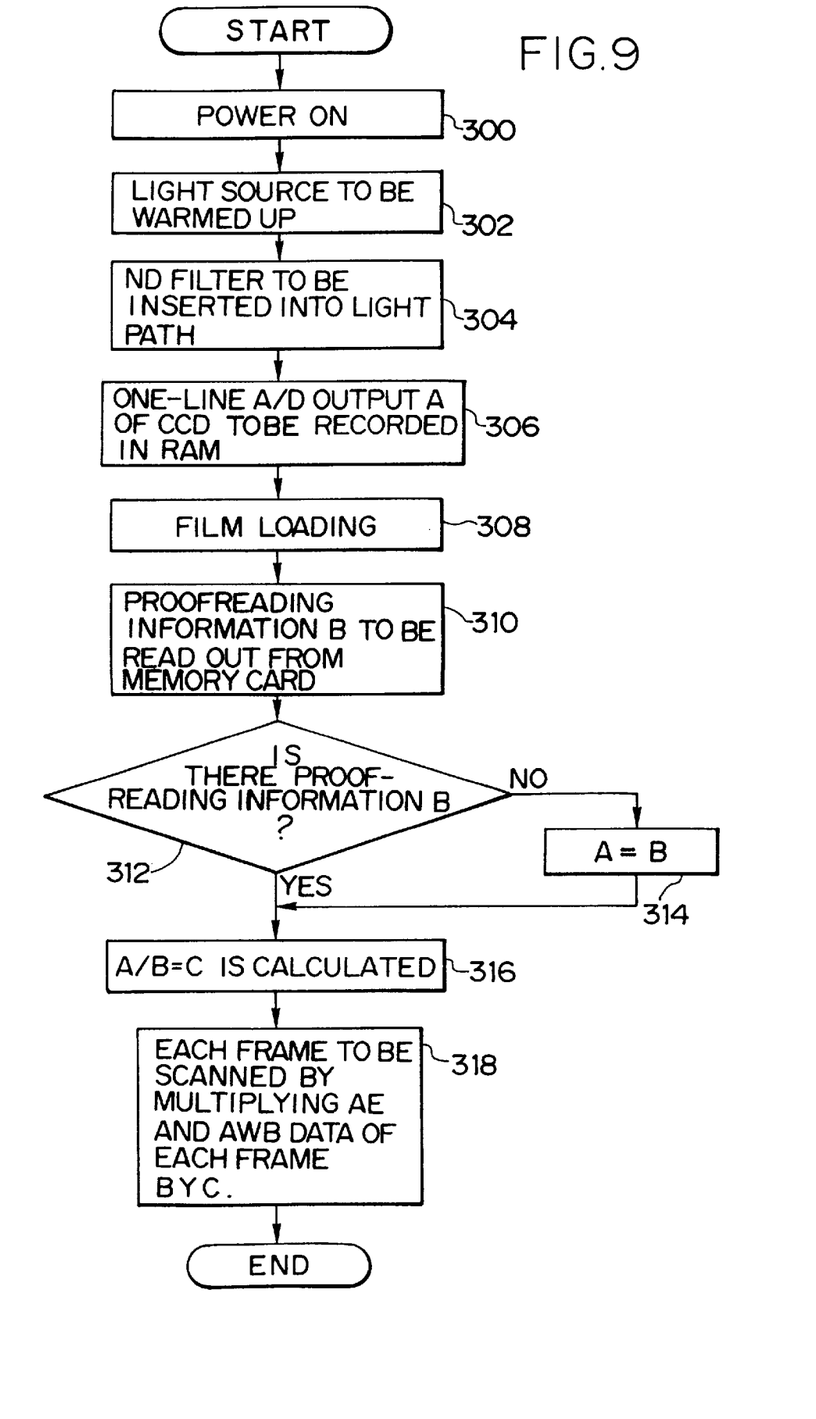
FIG. 9 is a view explaining the information relating to proofreading and how to proofread; and, FIG. 10 is a view showing the structure of other embodiment of the film player of FIG. 1.

Next, an explanation will be given of the proofreading information and the method of proofreading in the CCD pick-up optical system wherein the information relating to proofreading is used.

As shown in a flow chart of FIG. 9, the power source is turned on and the light source is warmed up (steps 300 and 302). Next, instead of the infrared cutting filter 132, a ND filter having a fixed transmission rate (for example, 20%) for preventing the CCD line sensor 142 from saturating is inserted into the light path (step 304). After that, the A/D output for one line of the CCD line sensor 142 is stored in the RAM 121 as the information A relating to proofreading (step 306).

Next, instead of the ND filter, the infrared cutting filter 132 is inserted into the light path and the film is loaded so that one film can be regenerated (step 308). The information B relating to proofreading which is picked up and stored from the memory card 120 previously in the same way as mentioned above is read out (step 310). Then, it is determined whether or not the information B is stored in the memory card 120 (step 312), and when there is no information B, the information A which is detected this time is made the information B (step 314). When there is the information B, the information B is used and the operation proceeds to the step 316.

In the step 316, the ratio of the information A and B (A/B=C) is calculated. Then, each frame is scanned by using the data which are obtained by multiplying the AE and AWB data by C respectively (step 318). As a result, even if the aging effect occurs in the CCD pick-up optical system, the high-quality film image can be regenerated in accordance with the previously-measured information B, AE data and AWB data. Incidentally, instead of inserting the ND filter, the A/D output for one frame in the case when the negative base portion of the film is picked up can be the information relating to proofreading.

In this embodiment, the index image data, etc. provided by the film player are stored on the memory card, but the index image data, etc. can be stored in the laboratory, too. The index image data can be a compressed image data such as a discreet cosine transfer (DCT). In this case, it is required to provide the device for stretching the compressed image data in the film player.

Figure 10:
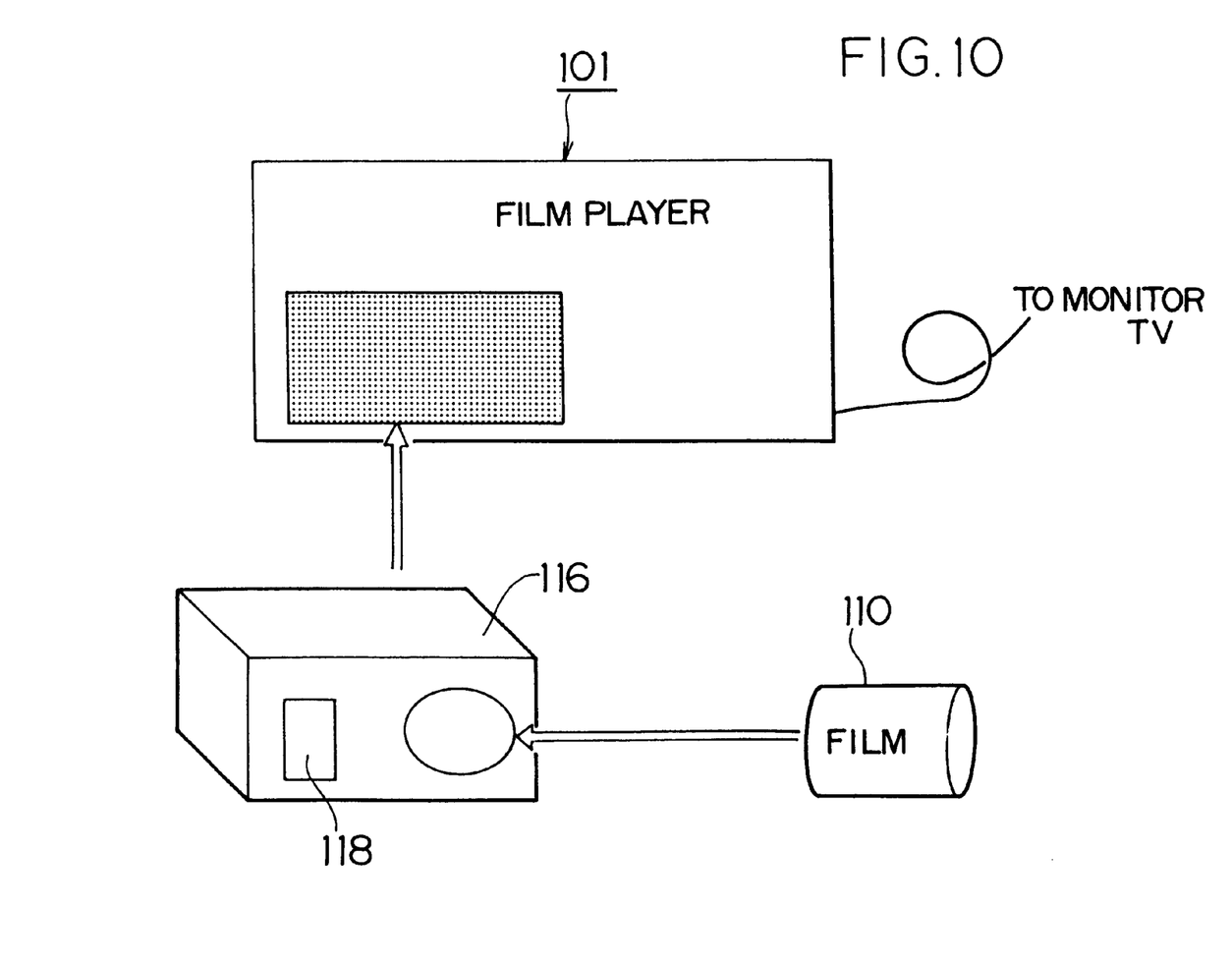

Moreover, in this embodiment, the memory card is used as the outer storage medium, but the present invention is not limited to this. The IC memory integrated into the film cartridge and the IC memory 118 integrated into the cartridge case 116 which houses the film cartridge 110 can be used as shown in FIG. 10. Incidentally, 101 is the film player which uses the cartridge case 116.

As has been described above, according to the film image input method of the present invention, the index image data which indicates all frames of the film in the film cartridge is stored in the outer storage medium which corresponds to the film cartridge, so that the index image can be regenerated. As a result, when a person orders for additional copies and the like, he can easily find the film cartridge without pulling the film out of the film cartridge. Furthermore, when a person enjoys the film image on the TV monitor, he can omit the pre-scanning and reproduce the high-quality film image in a short time.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film input image method, comprising:

feeding a developed photographic film stored in a film cartridge to an image reading part so as to read a film image;

storing an index image data, which indicates all frames of the film in said film cartridge, in an integrated storage medium which is integrated with said film cartridge;

reading out the index image data, which is stored in said integrated storage medium, when an index image of a plurality of frames is regenerated;

displaying the index image of a plurality of frames on a display in accordance with the readout index image data;

storing an output of information related to proof-reading (A) of a CCD;

checking, a first condition, if proof-reading information (B) is stored in the integrated storage medium; and calculating, if the first condition is satisfied, a value (C) which is the ratio of the proof-reading information (A/B), wherein said reading step includes multiplying data of each frame by the value (C), so that even if aging occurs in the CCD, high quality film image will occur in regeneration.

2. The film input image method of claim 1, wherein the developed photographic film is fed to a line sensor as the image reading part, which reads all frames of the developed photographic film and generates film images to be stored as the index image data.

3. A film image input method which comprises the steps of:

(a) storing an output of information related to proof-reading (A) of a CCD;

(b) loading a developed photographic film for regeneration;

(c) checking, a first condition, if proof-reading information (B) is stored in an external memory;

(d) calculating, if the first condition is satisfied, a value (C) which is the ratio of the proof-reading information (A/B); and (e) scanning each frame of the film by using data obtained by multiplying data of each frame by the value (C), so that even if aging occurs in the CCD high quality film image will occur in regeneration.

4. The method in accordance with claim 3, wherein in step (c) if the first condition is not satisfied, using the value (A) in place of the value (B) to determine the value (C).

5. The method in accordance with claim 3, further comprising:

storing at least data which are used when one frame is regenerated in said external storage medium; and image-processing, during said scanning step, the frame in accordance with the data which is stored in said external storage medium.

6. A film input image apparatus, comprising:

a reading unit for reading a film image from a developed photographic film stored in a film cartridge;

a processing circuit for generating an index image data from said film image read by said reading unit;

an integrated storage medium for storing said index image data which indicate a plurality of frames of a film in said film cartridge, said integrated storage medium being integrated with said film cartridge;

a memory control circuit for reading out the index image data stored in said integrated storage medium;

a monitor for displaying the index image in accordance with the readout index image data;

a storage medium for storing an output of information related to proof-reading (A) of a CCD; and a ratio circuit for calculating, if proof-reading information (B) is stored in said integrated storage medium, a value (C) which is the ratio of the proof-reading information (A/B), wherein said memory control circuit multiplies data of each frame by the value (C), so that even if aging occurs in the CCD, high quality film image will occur in regeneration.

7. The film input image apparatus of claim 6, wherein the reading unit is a line sensor.

8. A film image method comprising the steps of:

using a film cartridge which has a single spool and contains a developed photographic film wound around said spool, a storage medium being integrally provided in the film cartridge;

housing said film cartridge in a film cartridge housing part;

determining whether index image data representing multiple frame images on said developed photographic film is stored in the storage medium before removing said developed photographic film from said film cartridge housed in said film cartridge housing part;

when said index image data is determined as being stored in the storage medium, performing the steps of:
reading said index image data;
showing an index image on a display in accordance with the read index image data before removing said developed photographic film from said film cartridge housed in said film cartridge housing part;

when said index image data is determined as not being stored in the storage medium, performing the steps of:
feeding said developed photographic film contained in the film cartridge to a line sensor so as to read frames of the film;
scanning all frames on said developed photographic film with the line sensor to detect photographing data stored thereon;
automatically producing index image data corresponding to said film cartridge from said scanned photographic data; and
displaying an index image on said display according to said produced index image data and storing, in the storage medium of the film cartridge, said produced index image data which represents all frames on said developed photographic film.

9. A film image input apparatus comprising:

a line sensor for scanning all frames on a developed photographic film stored in a film cartridge to detect photographing data stored thereon, said film cartridge having a single spool around which said developed photographic film is wound;

a storage medium for storing index image data which represents multiple frames on the film in said film cartridge scanned by the line sensor, said storage medium being integrated with said film cartridge;

a film cartridge housing part in which said film cartridge is housed;

determination means for determining whether said index image data is stored in said storage medium before removing said developed photographic film from said film cartridge housed in said film cartridge housing part;

a processing circuit for automatically producing an index image data from said photographic data scanned by said line sensor when said determination means determines that said index image data is not stored in said storage medium;

a memory control circuit for storing, in said storage medium, the index image data produced by said processing circuit and reading out the index image data stored in said storage medium; and a monitor for displaying the index image in accordance with the readout index image data, before removing said developed photographic film from said film cartridge and upon said determination means determining that said index image data is stored in said storage medium, and for displaying an index image according to said index image data produced by said processing circuit upon said determination means determining that said index image is not stored in said storage medium.

10. A film image input method, comprising:

providing a film cartridge, having a single spool, around which a developed photographic film is wound;

housing said film cartridge in a film cartridge storage part and housing an IC memory card in a memory card housing part;

determining whether identification information of said film cartridge corresponds to identification information of a film cartridge stored in said IC memory card;

executing the following steps if it is determined that the identification information of said film cartridge corresponds to the identification information of the film cartridge stored in the IC memory card:
a) reading index image data indicating all frames on film in said film cartridge from said IC memory card, and
b) displaying an index image according to said read index image data; and executing the following steps if it is determined that the identification information of said film cartridge does not correspond to the identification information of the film cartridge stored in said IC memory card:
c) feeding said developed photographic film contained in the film cartridge to a line sensor so as to read frames of the film;
d) scanning all frames on said developed photographic film with the line sensor to detect photographing data stored thereon;
e) automatically producing index image data corresponding to said film cartridge from said scanned photographic data; and
f) displaying an index image on said display according to said produced image data and recording said produced index image data and the identification information of said film cartridge in said IC memory card.

11. A film image input apparatus comprising:

a line sensor for scanning all frames on a developed photographic film stored in a film cartridge to detect photographing data stored thereon, said film cartridge having a single spool, around which said developed photographic film is wound;

a cartridge housing part in which said film cartridge is housed;

a memory card housing part in which an IC memory card is housed;

determination means for determining whether identification information of a film cartridge corresponds to identification information of the film cartridge stored in an IC memory card housed in said memory card housing part, before removing said developed photographic film from said film cartridge housed in said film cartridge housing part;

a processing circuit for automatically producing an index image data from said photographic data scanned by said line sensor if said determination means determines that the identification information of said film cartridge corresponds to the identification information of the film cartridge stored in the IC memory card;

a memory control circuit for storing, in said IC memory card, the index image data produced by said processing circuit and the identification information of said film cartridge and for reading out the index image data and the identification information stored in said IC memory card; and a monitor for displaying an index image according to said index image data read from said IC memory card before removing said developed photographic film from said film cartridge, upon said determination means determining that the identification information of said film cartridge corresponds to the identification information of the film cartridge stored in said IC memory card, and for displaying an index image according to said index image data produced by said processing circuit upon said determination means determining that the identification information of said film cartridge does not correspond to the identification information of the film cartridge stored in the IC memory card.

* * * * *